March 22, 1966     H. B. OSBORN, JR     3,242,301
METHOD AND APPARATUS FOR SEAM WELDING METAL TUBING
Filed Dec. 6, 1963
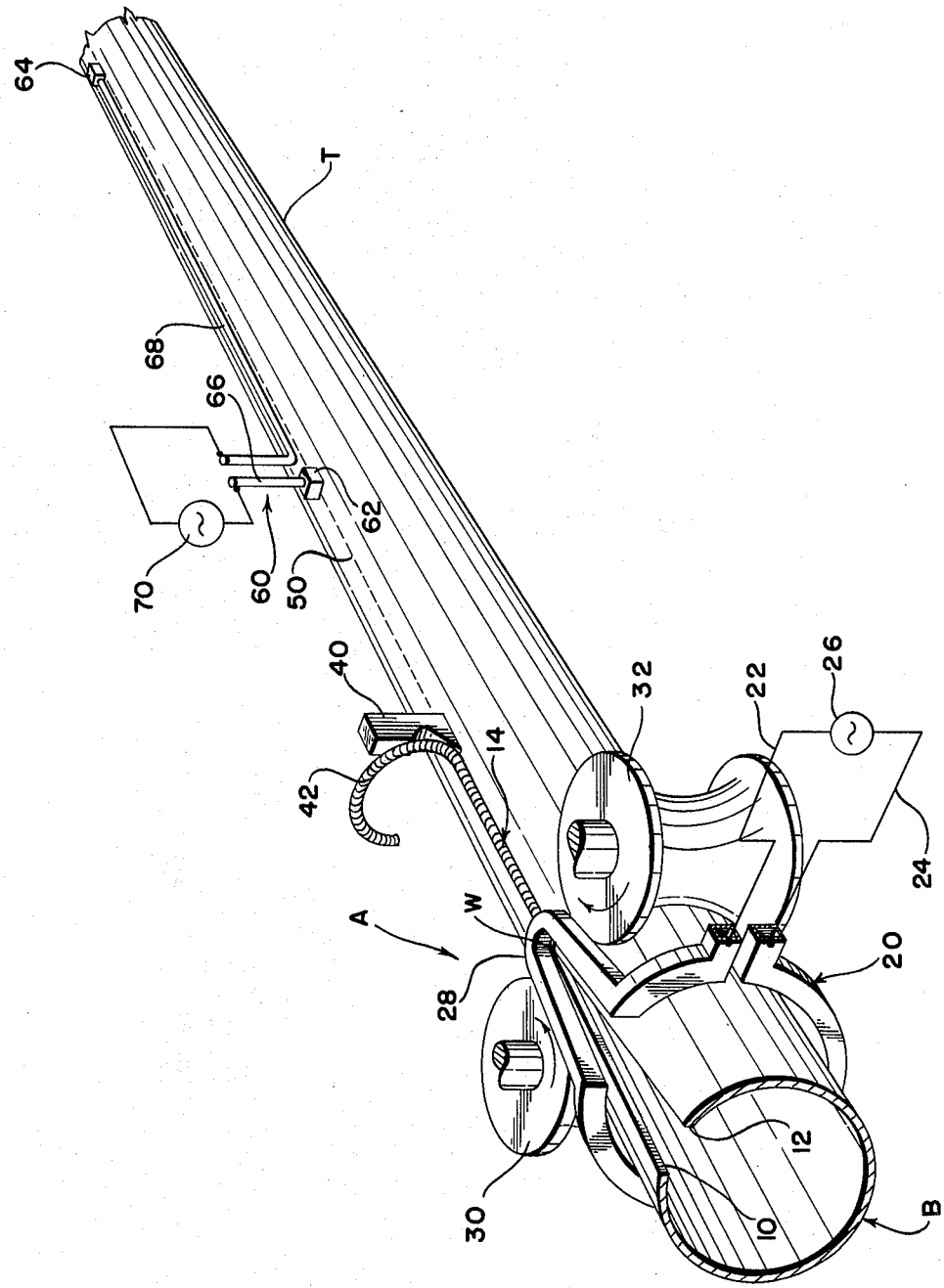
INVENTOR.
HARRY B. OSBORN, JR.
BY
ATTORNEYS

3,242,301
METHOD AND APPARATUS FOR SEAM WELDING METAL TUBING

Harry B. Osborn, Jr., Pepper Pike, Ohio, assignor to The Ohio Crankshaft Company, Cleveland, Ohio, a corporation of Ohio
Filed Dec. 6, 1963, Ser. No. 328,567
5 Claims. (Cl. 219—8.5)

The present invention pertains to the art of induction heating and more particularly to a method and apparatus for seam welding metal tubing.

The invention is particularly applicable to welding the converging edges of a rapidly moving skelp which is formed into tubing having a longitudinally extending seam and it will be described with particular reference thereto; however, it will be appreciated that the invention has much broader applications and may be used in other apparatus for seam welding metal tubing.

It has become common practice to manufacture metal tubing by first progressively forming a rapidly advancing skelp into a tubular configuration with the edges of the skelp converging into an abutting relationship at a point commonly called the welding point. An inductor is usually provided adjacent the welding point for inducing a voltage differential along the converging edges which voltage differential causes a current flow along the converging edges and across the welding point. This current flow raises the temperature of the converging edges to a temperature sufficiently high to allow pressure welding of the edges into a longitudinally extending seam. The temperature of the edges at the welding point must be approximately the molten temperature of the skelp; therefore, especially when the skelp is formed from high carbon steel and stainless steel, the area of the tubing adjacent the seam is usually hardened. This creates a brittle area around the seam and often results in subsequent failure of the tubing.

To overcome this disadvantage, it has been common practice to anneal the tubing in a soaking furnace, this requires a considerable amount of time, space and equipment. To overcome these disadvantages, an annealing device has been suggested similar to the device illustrated in the United States Letters Patent No. 3,015,018 by Willis C. Rudd. In the apparatus disclosed in this patent, an annealing device is attached onto a conventional tube mill directly behind the welding point of the converging edges. This annealing device is intended to anneal the longitudinally extending seam. During welding, the skelp is upset at the seam and excessive metal protrudes upwardly from the tubing along the seam. Thus, the annealing device immediately adjacent the welding point must be contoured to prevent contact between the device and the upset seam. After the annealing operation, the excessive metal is scarfed from the seam to exhibit a substantially smooth outer surface.

It has been found that an apparatus as illustrated in the Rudd patent is not effective for the intended purpose because the seam has not had an opportunity to cool below the critical temperature of the skelp before the annealing device reheats the seam area. Consequently, the seam is not satisfactorily annealed.

The present invention is directed toward a method and apparatus for seam welding metal tubing which apparatus includes an annealing device which assures that the welded seam is sufficiently annealed to prevent rupturing along the seam.

In accordance with the present invention the annealing device is spaced a substantial distance from the welding point so that the metal in the seam area will cool below the critical temperature of the skelp before it is reheated and annealed. This arrangement greatly enhances the resulting seam and is a substantial advance over the apparatus disclosed in the Rudd patent. In addition, in accordance with the present invention, the scarfing tool is positioned between the welding point and the annealing device so that the annealing device contacts a smooth outer surface and does not require contouring to accommodate an upset seam. The scarfing operation takes place before the metal in the seam can cool to any appreciable extent which makes the scarfing operation more efficient and the resulting seam surface more smooth.

In accordance with a specific aspect of the present invention, there is provided an improvement in a welding mill of the type adapted to form tubing by welding the converging edges of an advancing skelp. Such a welding mill includes a high frequency means for raising the temperature of the edges to a pressure welding temperature, pressure rolls for forcing the heated edges together to form a welded seam having excessive metal protruding outwardly therefrom and a scarfing tool for cutting the excessive metal from the surface of the tubing. The improvement, in accordance with the present invention, is the provision of an induction and conduction annealing device located on the opposite side of the scarfing tool from the high frequency means wherein the annealing device includes a first contact riding on the tubing adjacent the seam at a first location, a second contact riding on the tubing adjacent the seam at a location spaced from the first location, conductors for connecting the contacts across a source of high frequency alternating current, and at least one of the conductors extending in close spaced relationship with the seam and between the contacts.

In accordance with another aspect of the present invention there is provided a method of forming tubing from an advancing metal skelp with spaced edges comprising, forming the skelp into a tubing with the edges forming a longitudinally extending seam; electrically heating the edges to a pressure welding temperature; forcing the edges together to weld the edges at the seam; before the temperature drops below the critical temperature of the skelp, scarfing excessive metal from the seam; cooling the seam below the critical temperature of the metal forming the skelp; thereafter, conducting a high frequency current along the skelp seam in a predetermined path to raise the temperature of the seam to the annealing temperature of the metal forming the skelp; providing a conductor spaced only slightly from the path; and, directing the high frequency current through the conductor to control the current flowing in the path.

The primary object of the present invention is the provision of a device for annealing the seam area of welded tubing which device is economical, durable in use and highly efficient.

Another object of the present invention is the provision of a device for annealing the seam area of welded tubing which device is spaced a substantial distance from the welding point of the converging edges forming the welded seam so that the seam area can cool to a temperature below the critical temperature of the metal in the seam before it is annealed.

Still a further object of the present invention is the provision of a device for annealing the seam area of welded tubing which device is spaced a substantial distance from the welding point of the converging edges forming the welded seam and wherein the excessive metal formed at the welded seam is scarfed from the tubing before it is annealed.

Still a further object of the present invention is the provision of a device for annealing the seam area of welded tubing which device combines conduction heating and induction heating to raise the seam area to the annealing temperature.

Yet another object of the present invention is the provision of a method of forming seam welded tubing which includes the step of scarfing the excessive metal from the welded seam before the temperature of the seam area drops below the critical temperature of the metal forming the tubing.

Still a further object of the present invention is the provision of a method of forming seam welded tubing which includes scarfing the excessive metal from the welded seam before the seam is cooled below the critical temperature of the metal forming the tubing and, after the seam area has cooled below the critical temperature, annealing the seam area by a combined conduction and induction device.

These and other objects and advantages will become apparent from the following description used to illustrate the preferred embodiment of the invention as read in connection with the accompanying drawing in which the only figure is a pictorial view illustrating somewhat schematically the preferred embodiment of the present invention.

Referring now to the drawing wherein the showing is for the purpose of illustrating a preferred embodiment of the invention only and not for the purpose of limiting same, there is illustrated an apparatus A for seam welding a rapidly advancing skelp B to produce generally cylindrical tubing T. The skelp is formed from a metal such as high carbon steel and has edges 10, 12 converging at a welding point W. It is appreciated that the point of convergence of the edges 10, 12 may not be the actual point of welding; however, the welding point and the point of convergence are usually quite close and, for simplicity, both of these points may be defined as the welding point.

Converging edges 10, 12 are pressure welded into an unscarfed seam 14 having excessive metal protruding outwardly. To weld the converging edges 10, 12 into the unscarfed seam 14, there is provided, in accordance with the preferred embodiment of the present invention, a single turn inductor 20 having leads 22, 24 connected across a high frequency generator 26. The generator 26 energizes the inductor 20 by a high frequency alternating current. The current from generator 26 may vary between 10–450 kc.; however, in acordance with the preferred embodiment of the present invention, a 450 kc. alternating current is used to energize the inductor 20. The inductor 20 is provided with a V-shaped nose piece 28 extending along the converging edges 10, 12 and across the edges generally at the welding point W. Adjacent the welding point there are provided pressure rolls 30, 32 which forge the heated edges 10, 12 together to form the unscarfed seam 14. The excess metal protruding outwardly from the surface of the tubing T is caused by the small amount of upset developed when the edges are pressure welded together.

During the welding operation, the converging edges are heated to a temperature close to the molten temperature of the metal forming the skelp B. For instance, in the case of high carbon steel, this temperature may be as high as 2400–2500° F. Since the tubing T is rapidly traveling through the apparatus A, the seam area of the tubing cools only after the tubing has traveled a substantial distance. By positioning a scarfing tool 40 immediately behind the welding point W, the scarfing tool will remove the excessive metal 42 from the unscarfed seam 14 before this metal has an opportunity to cool substantially below the molten temperature of the metal. This results in an efficient scarfing operation that provides a smooth scarfed seam 50.

After the tubing T has moved a substantial distance through the apparatus A, the area around the seam, which is herein referred to as the "seam area," has an opportunity to cool below the critical temperature of the metal forming the skelp B. Consequently, the seam area, especially in the case of high carbon steel, becomes hardened so that the ductility of the tubing around the seam is somewhat reduced. To overcome this disadvantage, in accordance with the present invention, after the seam area of the tubing has cooled below the critical temperature, which may take many feet of travel through the apparatus A, the seam area is annealed by a device 60. This device 60 cannot be positioned adjacent the welding point W because the seam area requires a considerable amount of travel before it can cool below the critical temperature of the metal.

In accordance with the preferred embodiment of the present invention, the annealing device 60 comprises spaced sliding contacts 62, 64 which are biased against the tubing adjacent scarfed seam 50. Since the scarfed seam is smooth, the contacts can easily ride on the seam without requiring a special contour on the lower contact surfaces. The spaced contacts 62, 64 are electrically connected onto conductors 66, 68 which are, in turn, connected across generator 70. In accordance with the preferred embodiment of the present invention, it is desired that the seam area be heated to a substantial depth; therefore, the generator energizes the contacts with a current having a frequency of approximately 1 kc. The conductor 68 extends along seam 50 and is spaced only slightly therefrom so that the proximity effect of the high frequency current used to energize the sliding contacts 62, 64 will cause the current in the tubing to flow in a path generally below the conductor 68. It is appreciated that conductor 66 could be formed in close proximity to the seam 50 instead of the conductor 68. In addition, both of the conductors 66, 68 could be positioned in close proximity with the seam 50 to accomplish the same effect.

In operation, the converging edges 10, 12 are welded together to form an unscarfed seam 14, the seam is scarfed by tool 40 immediately adjacent the welding point W and, after the seam area has been cooled below the critical temperature, the annealing device 60 raises the temperature of the seam area to an annealing temperature. The annealing temperature will vary according to material used in the skelp; however, the temperature usually is in the range of 1300–1600° F.

The term "annealing" as used herein refers primarily to the heat treatment process wherein the hardened metal in the seam area is post heated above the critical temperature and then allowed to cool gradually to room temperature; however, it is appreciated that this term can also refer to the sub-critical annealing process applicable to some carbon steels wherein the hardened metal in the seam area is post heated to a temperature just below the critical temperature and then allowed to cool gradually to room temperature.

The present invention has been described in connection with a specific structural embodiment; however, it is appreciated that the structural embodiment may be changed without departing from the intended spirit and scope of the present invention as defined in the appended claims.

Having thus described my invention, I claim:

1. In a welding mill of the type adapted to form metal tubing by welding the converging edges of an advancing skelp, comprising a high frequency means for raising the temperature of said edges to the pressure welding temperature of said skelp, pressure rolls for forcing the heated edges together to form a welded seam having excessive metal protruding outwardly from said seam, and a scarfing tool for cutting the excessive metal from said seam, the improvement comprising: an induction and conduction annealing device located on the opposite side of said scarfing tool from said high frequency means and spaced from said high frequency means a sufficient distance to allow said seam to cool at least to approximately the critical temperature of the metal of said tubing, said annealing device including a first contact riding on said tubing adjacent said scarfed seam at a first location, a second contact riding on said tubing adjacent said scarfed seam at a location spaced from said first location, conductors for connecting said contacts across a source of high frequency alternating current, and at least one of said conductors extending in close spaced relationship with said seam and between said contacts and said scarfing tool being located closely adjacent to said high frequency means.

2. An improvement as defined in claim 1 wherein said source of high frequency current generates an alternating current having a frequency of approximately 1 kc.

3. The improvement as defined in claim 1 wherein said high frequency means includes an inductor surrounding said tubing adjacent said pressure rolls and a high frequency generator for energizing said inductor.

4. A method of forming tubing from an advancing metal skelp with spaced edges comprising, forming said skelp into a tubing with said edges forming a longitudinally extending seam, electrically heating said edges to a pressure welding temperature, forcing said edges together to weld said edges at said seam, before the temperature of said seam drops below the critical temperature of the metal forming said skelp, scarfing the excessive metal from said seam, allowing said seam to cool below said critical temperature, thereafter, conducting a high frequency current along said scarfed seam in a predetermined path to raise the temperature of said seam to the annealing temperature of the metal forming said skelp, providing a conductor spaced only slightly from said path, and directing said high frequency current through said conductor to control the current flowing in said path.

5. In a welding mill of the type adapted to form tubing by welding the converging edges of an advancing skelp, comprising a high frequency means for raising the temperature of said edges to the pressure welding temperature of said skelp, pressure rolls for forcing the heated edges together to form a welded seam having excessive metal protruding outwardly from said seam, and a scarfing tool for cutting the outwardly protruding excessive metal from said seam, the improvement comprising: an induction and conduction annealing device located on the opposite side of said scarfing tool from said high frequency means, said annealing device including a first contact riding on said tubing adjacent said scarfed seam at a first location, a second contact riding on said tubing adjacent said scarfed seam at a location spaced from said first location, conductors for connecting said contacts across a source of high frequency alternating current, and at least one of said contacts extending in close spaced relationship with said seam and between said contacts, said first and second contacts riding on said scarfed seam.

References Cited by the Examiner
UNITED STATES PATENTS 3,015,018 12/1961 Rudd _____ 219—67
3,072,771 1/1963 Kennedy _____ 219—8.5

RICHARD M. WOOD, *Primary Examiner.*